United States Patent Office 3,393,544
Patented July 23, 1968

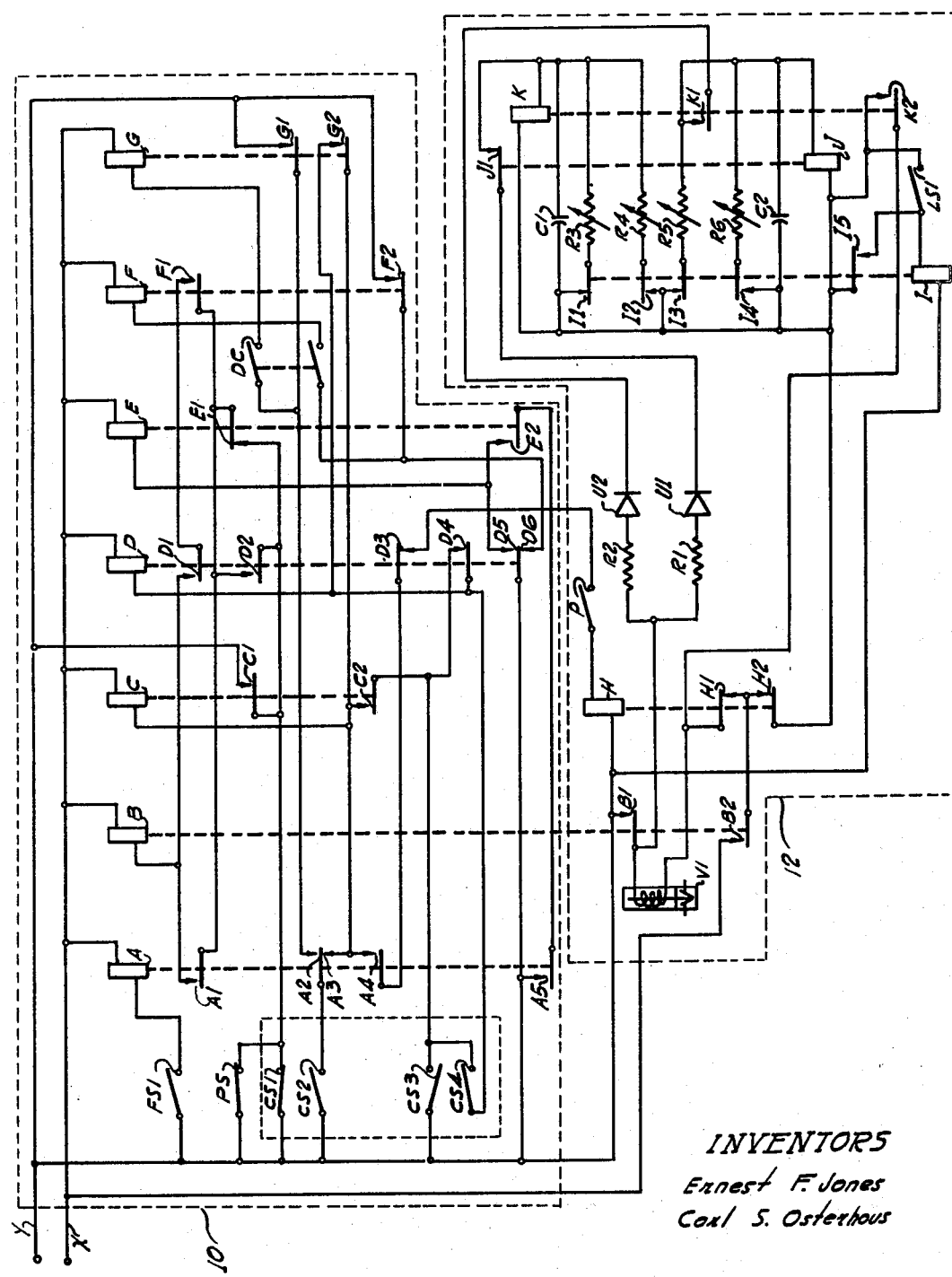

3,393,544
AUTOMATIC CONTROL FOR CLUTCH AND BRAKE FOR PRESS BRAKE
Carl S. Osterhous, Indianapolis, and Ernest F. Jones, Whitestown, Ind., assignors to Stewart-Warner Corporation, Chicago, Ill., a corporation of Virginia
Filed Mar. 25, 1966, Ser. No. 537,511
5 Claims. (Cl. 72—29)

This invention relates in general to control apparatus for a press brake and more particularly to an improved circuit for securing short successive incremental advances of the ram of a press brake to brake or form a metal workpiece.

The desirability of forming the workpiece with short successive incremental ram advances arises from the tendency of large metal workpieces to form incorrectly if a single ram advance stroke is used to completely form the metal. In long workpieces improper forming may result from the workpiece overhang failing to follow the bend or form introduced by the ram. In addition, the overhang on such long pieces when moved suddenly in response to the forming operation are dangerous to operating personnel who may be near the moving end. Wide pieces likewise form more correctly in response to short successive incremental advances of the ram.

Formerly, short successive advances of the ram were usually accomplished by one operator controlling the press brake manually in an operation known as double clutching. This led to considerable operator fatigue and often two operators were required with one operator holding and guiding the workpiece and the other or both operators controlling the machine.

One objective of the present invention, therefore, is to provide a circuit for controlling the ram of a press brake to automatically advance in short increments or steps for forming a workpiece.

Another object of the present invention is to provide a circuit for controlling the ram of a press brake to automatically advance at one rate for one type of workpiece and at another rate for a different type of workpiece.

Still another object of the present invention is to provide means for selecting the rate at which the ram of a press brake is automatically advanced for forming a workpiece.

Other objects and features will become apparent on examination of the following specification and claims together with the drawing.

In the drawing a control circuit providing the usual control of the ram of a press brake is indicated by the reference character 10 and a relay flip-flop circuit for automatically advancing the ram of a press brake in short successive increments is indicated by the reference character 12.

The circuit 10 comprises a series of relays A–G which are used for controlling conventional movement of the ram through a solenond valve V1. The valve V1 controls the engagement of a clutch (not shown) for driving the ram (not shown) in any well known manner. The valve V1 together with all relays are energized from an AC power supply indicated by leads X and Y. The valve V1 is under direct control of relay B for conventional ram movements. Relay B in turn is operated initially by relay A in response to operation of a manually controlled switch FS1.

The conventional movements of the ram include moving the ram continuously against the workpiece from its home position to form the piece and then reciprocating the ram back to its normal position. In addition, the ram may be brought into a preset stop position usually in engagement with the workpiece and then moved against the workpiece in a continuous advance to form the piece, after which the ram is returned to normal. Switches for performing other functions of the ram such as continuous cycling and certain return movements are not illustrated herein, since they are not believe germaine to the present invention.

The present invention adds to the just described conventional functions or movements by enabling the ram to be automatically moved at selected rates in short incremental advances or steps under control of circuit 12 from the preset stop position against the workpiece to form the piece. The circuit 12 is constructed to allow one rate of ram advance to be used for long workpieces and another rate to be used for other workpieces with both rates being adjustable.

To effectuate the aforementioned conventional movements a series of adjustably positioned cam operated switches CS1–CS4 are provided together with a manually operable switch PS and a manually operable double pole switch DC. The cam switches CS1–CS4 are conventionally operated by a cam (not shown) which moves in correspondence with the ram position. If switch PS is open, cam switch CS1 is effective for stopping the ram at the preset stop position usually in engagement with the workpiece, whereafter switch CS2 permits the ram to be thereafter operated for forming the workpiece. From the preset stop position the ram may be driven either in one continuous movement, if switch DC is closed, to form the workpiece, or if switch P is closed to render circuit 12 effective, the ram is driven automatically in a series of short successive steps or increments to form the workpiece.

The switches CS1 and CS2 are optionally positioned for operation at a desired point in the descent of the ram and are released when the cam has moved 180° from that position which occurs during return of the ram to its normal position. Switch CS2 enables the operation of relays C, D and E on release of switch FS1, if switch DC has been operated to operate relays F and G. With relays C, D and E operated, relay B is controlled to continuously move the ram against the workpiece to form the workpiece and thereafter return the ram to normal and terminate ram movement.

Switch CS3 is used for maintaining relay B operated by holding relays C and D operated, after either switch CS2 or CS4 has restored on the return stroke of the ram. Switch CS4 is positioned to be closed when the ram reaches the bottom of its stroke and opens when the ram starts to return. Switch CS4 is used in the event the preset stop operation is omitted or when circuit 12 is used to operate relays D and E after the ram reaches the bottom of the stroke for controlling relay B to effect the proper return movement of the ram and terminate that movement when the ram returns to normal. Switch CS3 is positioned to be opened when the ram reaches the top or normal position and closes in response to the initiation ram descent so that it acts as a holding switch to maintain the ram operated until the ram is home.

Circuit 12 includes relays H, I, J and K. Relay H is operated under control of switch CS2, when the ram reaches the preset stop position, if switches PS and P are operated. With relay H operated the ram is automatically advanced in short increments from the preset stop position through alternate operations of relays K and J, which operate as a relay flip-flop circuit.

A circuit limiting resistor R1 and a unidirectional circuit element U1 are connected to relay K and a second current limiting resistor R2 and a unidirectional circuit element U2 are adapted to be connected to relay J under control of relay K. Relay H first operates relay K, which has a time delay network comprising capacitor C1 and adjustable resistor R3 connected thereacross. Relay J energizes after a time interval to advance the ram. Relay K also energizes relay J which has a time delay network comprising capacitor C2 and adjustable resistor R5 connected thereacross. Relay J releases relay K after a time interval determined by the time constants of capacitor C1 and the adjustment of resistor R3 to stop the ram after a short movement. With relay K released, relay J also releases after a time interval to in turn reoperate relay K and repeat the short ram movement. The ram is thus repetitiously advanced in short increments until it reaches the bottom position where switch CS4 operates to cause the ram to return to normal.

In the event a wide piece is to be formed using circuit 12, it is often desirable to use a different rate of advance than that provided by resistors R3 and R5. In this case a switch LS1 is positioned to be activated by a workpiece of desired width when inserted into the jaw of the brake to in turn energize relay I after relay H is energized. Relay I disconnects adjustable resistors R3 and R5 from across relays K and J respectively and connects adjustable resistors R4 and R6 across relays K and J respectively. Thereafter the ram is advanced from the preset stop position in a similar manner to that described, but at a different rate.

It will be appreciated of course that a large number of factors go into choosing the rate of advance and these may include the metal gauge, dimension and degree of forming wherefore resistors R3–R6 are adjustable to properly compensate for these factors.

To operate the ram for forming a workpiece in the ordinary manner, the operator depresses the foot switch FS1 to energize relay A. Relay A closes contacts A1 to complete a circuit from lead X through the preset stop cam contacts CS1 and switch PS in shunt and through contacts E1 to energize relay B. Relay B closes contacts B1 and B2 to energize the solenoid valve V1 through normally closed contacts H1. The valve V1 in turn causes the ram clutch to be engaged and the ram to be driven downward toward the work. Switch CS3 closes as soon as the ram starts to move. As the ram descends it operates the preset stop switches CS1 and CS2 at a point in the ram stroke dependent on the position in which the switches are set for providing a preset stop. Opening switch CS1 is immaterial, in this instance, however, as power is supplied to relay B from switch PS. Closing switch CS2 is also immaterial at this time.

When the ram reaches the bottom of the stroke corresponding to the position in which switch CS4 is operated, power from switch CS3 is extended through switch CS4 to relay D. In moving to the bottom of the stroke, the ram of course forms the workpiece. Relay D operates and locks operated through contacts D4 to switch CS3. At contacts D2 contacts E1 are shunted and at contacts D5 relay E is operated to open contacts E1. Relay E locks operated through contacts E2 to contacts A5.

The ram continues to move, as the clutch is still engaged under control of valve V1 and relay B. The ram now returns to its normal or home position. As the ram rises, it passes through the position in which switches CS1 and CS2 return to normal. Switch CS4 also opens after the ram moves from its bottom position, however, relay D remains locked operated at switch CS3 until the ram reaches its home position. When the ram is in its home position, switch CS3 opens to deenergize relay D. Relay D opens contacts D2, while contact B1 remain open so that power to relay B is restored and relay B releases. This restores valve V1 and the ram stops. The operator now releases switch FS1 to restore relay A. Relay A restores to release relay E at contacts A5, however, relay A cannot reenergize at this time as contacts A1 are open.

If switch FS1 is released during downward movement of the ram, relay A releases of course to restore relay B and stop the ram by restoring the power to valve V1 at contacts B1 and B2. Relay C energizes over contact A3, if the ram has passed through the preset stop position to close switch CS2. Relay C supplies an alternate ground for relay B at contacts C1. At contacts C2 relay C locks operated to contacts CS3. Reoperation of switch FS1 reoperates relay A to reenergize relay B and the ram again moves down.

When the ram reaches the bottom of its stroke switch CS4 closes and a circuit is completed to relay D, which operates as previously described to operate relay E as described. Operation of the ram therefore continues as previously described, and when switch CS3 opens at the end of the ram cycle, relays C and D restore. Relays A and E are then restored as previously described on release of switch FS1.

In the event relay A is deenergized during upward movement of the ram, the circuit to relay B is opened at contacts A1 as described. Relay C energizes, as described, in the event switch CS2 had not yet opened. The movement of the ram is halted. Reoperation of relay A causes relay B to be reenergized at contacts A1 and upward movement of the ram continues until switch CS3 opens at the top of the ram cycle to deenergize relays C, D and B. Relays A and E are restored on release of switch FS1 as described.

To bring the ram to a preset stop position, usually in engagement with the workpiece before forming the workpiece, the preset switch PS is opened and switches CS1 and CS2 adjusted for operation at the appropriate position of the ram cycle. The double pole switch DC is operated to operate relay F through contact D6. Relay F prepares an alternate circuit for relay B at contacts F1. At contacts F2 relay F locks operated through switch DC. Switch DC also prepares a circuit for relay G.

Operation of switch FS1 energizes relay A to in turn energize relay B through switch CS1 and contacts E1. The ram moves down and stops at the preset stop position when switch CS1 opens to deenergize the relay B since switch PS is now open. Relay G now energizes through switch CS2, contacts A2 and switch DC. Relay G locks operated through contacts G1 and switch DC.

The operator now releases relay A to operate relay C through switch CS2 and contacts A3 as explained. Relay D also now operates through switch CS2 and contacts A3 and G2. Relay D operates relay E as explained and completes a circuit for relay B from contacts C1, D2, F1 and D1. The ram therefore resumes its movement. On reaching the bottom of the ram stroke, switch CS4 closes; however, relay D is already energized. The ram therefore continues to move and now returns to its home position where switch CS3 opens. Switch CS2 is already open and therefore relays C and D restore when switch CS3 opens. Since relay E is not locked operated at this time because contacts A5 are open, relay E restores when relay D restores; however, no circuit to relay B is completed since contacts A1 and D1 are open.

Relays F and G remain energized through the respective contacts of switch DC and their respective locking contacts. Thereafter, reoperation of relay A through switch FS1 brings the ram to the preset stop position and release of relay A permits the cycle to be repeated.

To pulse the ram in short successive steps to form the workpiece, switch PS is opened and switch P closed. Switch DC is left unoperated. Operation of relay A through switch FS1 brings the ram to the preset stop position as previously explained to open switch CS1 and close switch CS2. Switch P may be operated either at this time or before the ram movement was initiated. Switch FS1 is now restored to operate relay C over contacts A3 as previously explained, and it locks operated through contacts C2 and switch CS3. Reoperation of switch FS1 then reoperates relay A to complete a circuit from switch CS3, contacts C2, A4 and D3, through switch P to relay H. Relay B is operated as previously explained; however, relay H prevents energization of valve V1 at contacts H1.

Relay H closes contacts H2 to extend lead X to relays J and K.

A circuit is now completed from contacts B1 through the current limiting resistor R1, unidirectional circuit element U1 and contacts J1 to relay K through contacts H2 and B2. A timing network comprising capacitor C1 connected in shunt with relay K delays its operation and an adjustable resistor R3 connected through contacts I1 across relay K controls the discharge of capacitor C1. The relay K therefore operates after a short time period elapses.

Relay K on energizing closes contacts K1 and K2. Contacts K2 shunt open contacts H1 to energize valve V1 through contacts B2 and H2 for initiating ram descent. Contacts K1 completes a circuit for energizing relay J. Power is applied to relay J through the current limiting resistor R2 and unidirectional circuit element U2. A timing network comprising capacitor C2, in shunt with relay J, delays the operation of relay J for a time period while an adjustable resistor R5 connected through contacts 13 with relay J and capacitor C2 controls the discharge time of capacitor C2. Relay J energizes to open the circuit to relay K at contacts J1. Relay K therefore deenergizes after a time period determined by the time constants of C1 and R3 to open contacts K2 and release valve V1 after the ram has made a slight descent. Contacts K1 also open to deenergize relay J.

Relay J deenergizes after a time period determined by the time constants of C2 and R5. Relay J restores to reclose the circuit to relay K at contacts J1. Relay K therefore reenergizes to move the ram down an additional increment. Relays J and K continue to cycle or operate as a flip-flop in the described manner slowly forming the workpiece in short incremental steps selected as desired by the adjustment of resistors R3 and R5 until the ram bottoms and operates contacts CS4. Switch CS4 on closing operates relays C and D as described and at contacts D3, relay H is restored to deenergize relays H, K and J. The ram is now returned to normal and stops when switch CS3 opens. Relays C and D restore as explained to prevent further operation of the ram until the operator restores relays A and E as explained, to thereafter permit the cycle to be repeated and another workpiece to be formed.

If the workpiece is wide it is usually desirable to pulse the ram through the workpiece at a different rate than that just described. In this case the switch LS1 is set to be operated in response to engagement with one edge of a workpiece of a desired width after insertion in the jaw of the brake. Switch PS is opened and switch P is closed. Relay C operates as described in response to the release of relay A after switch CS2 closes in response to the ram being in the preset stop position. Relay H then energizes in response to the reoperation of relay A as described. Relay I now energizes over switch LS1 and contacts H2 and B2 in response to the operation of relay H. Relay I closes contacts I5 to shunt switch LS1 and opens the circuits to resistors R3 and R5 at contacts I1 and I3 and instead connects adjustable resistors R4 and R6 in shunt with relays K and J, respectively, and capacitors C1 and C2, respectively, at contacts I2 and I4, respectively. Pulse control of the ram descent is now provided in a manner similar to that previously described except that the rate of pulsing is altered in accordance with the values of resistors R4 and R6. The ram completes its cycle as previously described and on release of relay H at the bottom of the ram stroke, the circuit to relay I is opened. Relay I restores and when the ram is stopped, the workpiece is withdrawn from the brake switch LS1 opens so that the operation may be repeated with a new workpiece.

The foregoing constitutes a description of an improved control system for a press brake with the inventive concepts of said system believed set forth in the accompanying claims.

What is claimed is:

1. A circuit for controlling the ram of a press brake to advance incrementally in short successive steps to form a workpiece, the improvement comprising means for initiating continuous movement of said ram in one direction, means for terminating movement of said ram at a predetermined position thereafter, and last means operated for automatically advancing said ram in a series of short successive movements to a second predetermined position to form said workpiece.

2. The circuit claimed in claim 1 in which said last means comprises a pair of relays, a capacitor individual to each relay and connected across the respective relay, means for energizing one of said relays for advancing said ram, means operated by said energized relay for energizing the other of said relays for deenergizing said one relay and terminating advance of said ram, means for deenergizing said other relay in response to the deenergization of said one relay to cause automatic reenergization of said one and other relays whereby said ram is incrementally advanced, and an adjustable resistor individual to each relay connected across the respective relay to control the discharge time of the respective capacitor for controlling the deenergization time of the respective relay.

3. In the circuit claimed in claim 2 a second adjustable resistor individual to each relay, and optionally operable means for disconnecting each of the first resistors and connecting each of the second resistors across the respective relays in response to the insertion of a workpiece of a predetermined dimension in said brake.

4. A combination for use with a press brake control circuit of the type arranged to advance the brake ram from a normal position to a preset position in response to the operation of one switch and having optionally operable means effective to thereafter advance said ram in one step to a bottom position in response to the release of said switch and then return said ram to said normal position, the improvement comprising timing means, a second switch for preparing said timing means, means for operating said timing means in response to the operation of said second switch and the release of said one switch after said ram reaches said preset position, and last means operated in response to the reoperation of said one switch for controlling said timing means to automatically advance said ram in short successive steps until said ram reaches said bottom position.

5. A timing circuit for advancing the ram of a press brake in short incremental steps, the improvement comprising a pair of relays, a capacitor connected in shunt with each relay, a pair of adjustable resistors for each relay with one resistor of each pair optionally connected in shunt with a respective relay, means controlled by one of said relays for energizing the other relay and for simultaneously advancing said ram, and means controlled by said other relay for deenergizing said first relay to both terminate advance of said ram and deenergize said other relay with the time period said ram is advanced being dependent on the successive charge times of said capacitors and the time between successive advances of said ram being dependent on the discharge time of said capacitors.

References Cited

UNITED STATES PATENTS

| | | | |
|---|---|---|---|
| 2,775,129 | 12/1956 | Peras | 192—142 |
| 2,840,135 | 6/1958 | Fowler | 192—144 |
| 2,909,259 | 10/1959 | Diener | 192—144 |
| 2,959,263 | 11/1960 | Simson | 192—144 |

CHARLES W. LANHAM, *Primary Examiner.*

G. P. CROSBY, *Assistant Examiner.*